United States Patent [19]

Harada

[11] Patent Number: 4,669,372
[45] Date of Patent: Jun. 2, 1987

[54] VENDING MACHINE BEVERAGE BREWING APPARATUS

[75] Inventor: Tsutomu Harada, Takasaki, Japan

[73] Assignee: Sanden Corporation, Gunma, Japan

[21] Appl. No.: 802,335

[22] Filed: Nov. 26, 1985

[30] Foreign Application Priority Data

Dec. 4, 1984 [JP] Japan .............................. 59-183140[U]

[51] Int. Cl.⁴ ............................................ A47J 31/00
[52] U.S. Cl. .................................................. 99/289 R
[58] Field of Search ............. 99/289 R, 289 D, 289 P, 99/279, 287; 426/433

[56] References Cited

U.S. PATENT DOCUMENTS

3,292,526 12/1966 Heier ...................................... 99/289
3,349,690 10/1967 Heier ...................................... 99/283
4,271,753  6/1981 Neely ................................. 99/289 R Primary Examiner—Robert W. Jenkins
Attorney, Agent, or Firm—Banner, Birch, McKie & Beckett

[57] ABSTRACT

A beverage brewing apparatus suitable for use in a vending machine has a frame supporting a vertically movable open-bottom cylinder and piston slidably disposed within the cylinder. The reciprocal movement of the piston within the cylinder is controlled by the operation of a cam element operated by a motor through a cam shaft, with this operation of the cam applying a vertical force to push the piston and also applying horizontal force tending to offset the axial center lines between the piston and cylinder. Therefore, the apparatus is provided with means for preventing the piston from lateral horizontal movement relative to the cylinder to insure improved sealing between the piston and cylinder. This horizontal movement preventing device comprises a plurality of guide elements vertically disposed relative to each other on the frame to guide the reciprocal movement of the piston with the lowermost positioned guide element being vertically movably supported on the frame and normally biased upwardly against the upper positioned element.

4 Claims, 11 Drawing Figures

VENDING MACHINE BEVERAGE BREWING APPARATUS

BACKGROUND OF THE INVENTION

This invention relates to a beverage brewing apparatus for use in a beverage vending machine, and more particularly, to improvement of the sealing situation between the brewing liquid cylinder and piston of the apparatus during the brewing operation.

Beverage brewing apparatus suitable for use in vending machines for preparing single cup quantities of beverages from beverage material is well known in the prior art. For example, U.S. Pat. No. 3,349,690 issued to William Heier discloses one construction for such a brewing apparatus.

Figure 1:
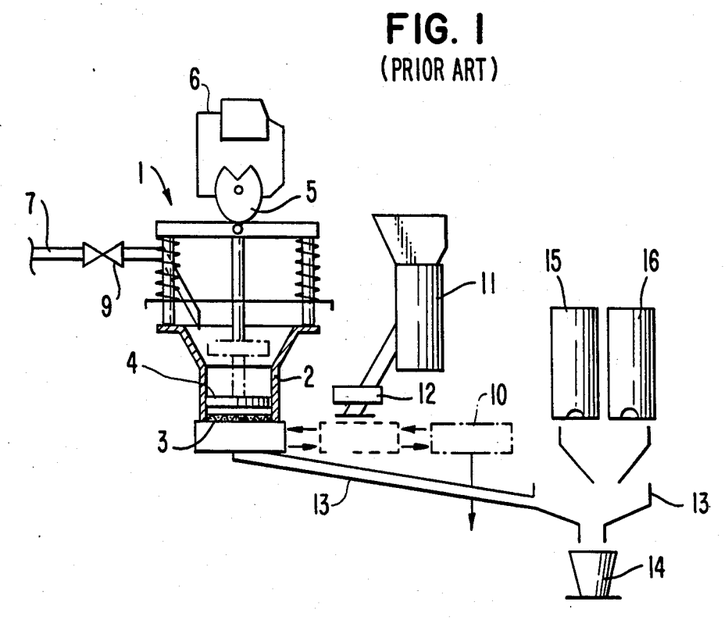
FIG. 1 is a diagrammatic view of a prior art brewing apparatus to illustrate the basic construction and brewing cycle.

Referring to FIG. 1 on the application drawings, the basic construction and brewing cycle of a prior art apparatus will be described. Frame 1 of the apparatus supports a vertically movable open-bottom cylinder 2 which has the bottom opening covered by a filter member 3. A vertically movable piston 4 is disposed within cylinder 2 and relative movement between cylinder 2 and piston 4 is created by operation of cam member 5 driven by motor 6. One end opening of a duct 7 is connected with a water tank (not shown) through an electromagnetic valve 9, this end opening being closely placed above the upper opening of cylinder 2 to supply hot water into cylinder 2. A brewing cavity 10, which is generally reciprocable horizontally between a brewing position (this position being shown by solid lines in FIG. 1) and a rest position (this position being shown by dot and dash lines in FIG. 1), is placed beneath the cylinder 2 and sealed with the lower opening of cylinder 2 in the brewing position.

The prior art apparatus is also provided with a coffee hopper 11 which is connected with canister 12 for receiving a charge of coffee. Canister 12 is provided with suitable feed means to deliver a predetermined quantity of fresh ground coffee from hopper 11 at a point prior to the start of the brewing operation.

In this apparatus, brewing cavity 10 moves horizontally toward the brewing position from the rest position to a place beneath the bottom opening of cylinder 2. During this horizontal movement the ground coffee is supplied into the brewing cavity 10 from coffee hopper 11 at a supply position (this position being indicated by dotted lines in FIG. 1). When brewing cavity 10 is properly aligned beneath the cylinder 2, due to the operation of cam member 5, cylinder 2 is moved downwardly into tight engagement with cavity 10. This forms a chamber which is filled with hot water supplied through duct 7.

Thereafter, piston 4 moves downwardly to force the water through the filter member 3 into the ground coffee in cavity 10 and through an outlet conduct 13 to a cup 14 placed at a dispensing station. Before introducing coffee into the cup, the extracted coffee would be mixed with a suitable amount of sugar and/or cream, both of which are supplied from canisters 15 and 16, respectively. Thereafter, the brewing cavity 10 containing the spent coffee grounds is moved back to its rest position and the grounds in the brewing cavity 10 are discarded at a position which is disposed just before the rest position is reached. When the brewing cavity 10 is returned to its rest position, one brewing cycle has been completed.

During the brewing cycle, particularly during the extracting operation, the sealing between the inner surface of cylinder 2 and outer peripheral surface of piston 4 should be very good to effect the most favorable extracting operation. Therefore, since piston 4 is slidably disposed within the cylinder and is provided with a sealing member, the piston 3 should be moved straight downwardly. However, movement of piston 4 is controlled by the operation of cam member 5 so a horizontal force component acts against piston 4 by the operation of cam member 5. Thus, it is possible for the axial center of piston 4 to become offset from the center of cylinder 2 and as result of this offset, the sealing conditions between piston 4 and cylinder 2 become impaired.

SUMMARY OF THE INVENTION

It is a primary object of this invention to provide an improved beverage brewing apparatus which provides favorable extracting operations while still having a simple construction.

It is another object of this invention to provide a beverage brewing apparatus which is provided with preventive means for limiting offset of the axial center line of the piston member from the center line of the brewing liquid cylinder member to secure improved sealing between these members.

It is still another object of this invention to provide a beverage brewing apparatus capable of easily replacing existing apparatus by simple modification of the existing apparatus.

A beverage brewing apparatus according to this invention includes a frame and a vertically movable cylinder member which is supported on the frame, this cylinder member has an open top and an open bottom. A piston member is reciprocally disposed within the cylinder. Brewing liquid supply means which has a discharge opening positioned to discharge brewing liquid into the open top of the cylinder is connected to a liquid heating tank in which a brewing liquid is stored. A brewing cavity is disposed beneath the cylinder to be horizontally reciprocable between a brewing position and a rest position. This cavity is tightly engaged with the open bottom of the cylinder to form the brewing chamber when disposed in the brewing position. A cam member which is rotated by a motor controls the relative movement between the cylinder and piston, and also determines the timing of the supply of liquid and beverage material. The piston member has a mechanism for preventing offset of the axial center line of the piston from the center line of the cylinder while downward movement of the piston and cylinder occurs. This mechanism includes a plurality of guide elements which are vertically disposed on the inner surface of the frame to regulate the reciprocal motion of the piston with the lowermost positioned guide element being vertically movably supported on the frame and being normally biased upwardly against the upper positioned element.

Further objects, features and other aspects of this invention will be understood from the following detailed description of the preferred embodiment of this invention while referring to the annexed drawings.

DETAILED DESCRIPTION OF THE PREFERRED EMBODIMENT

Figure 2:
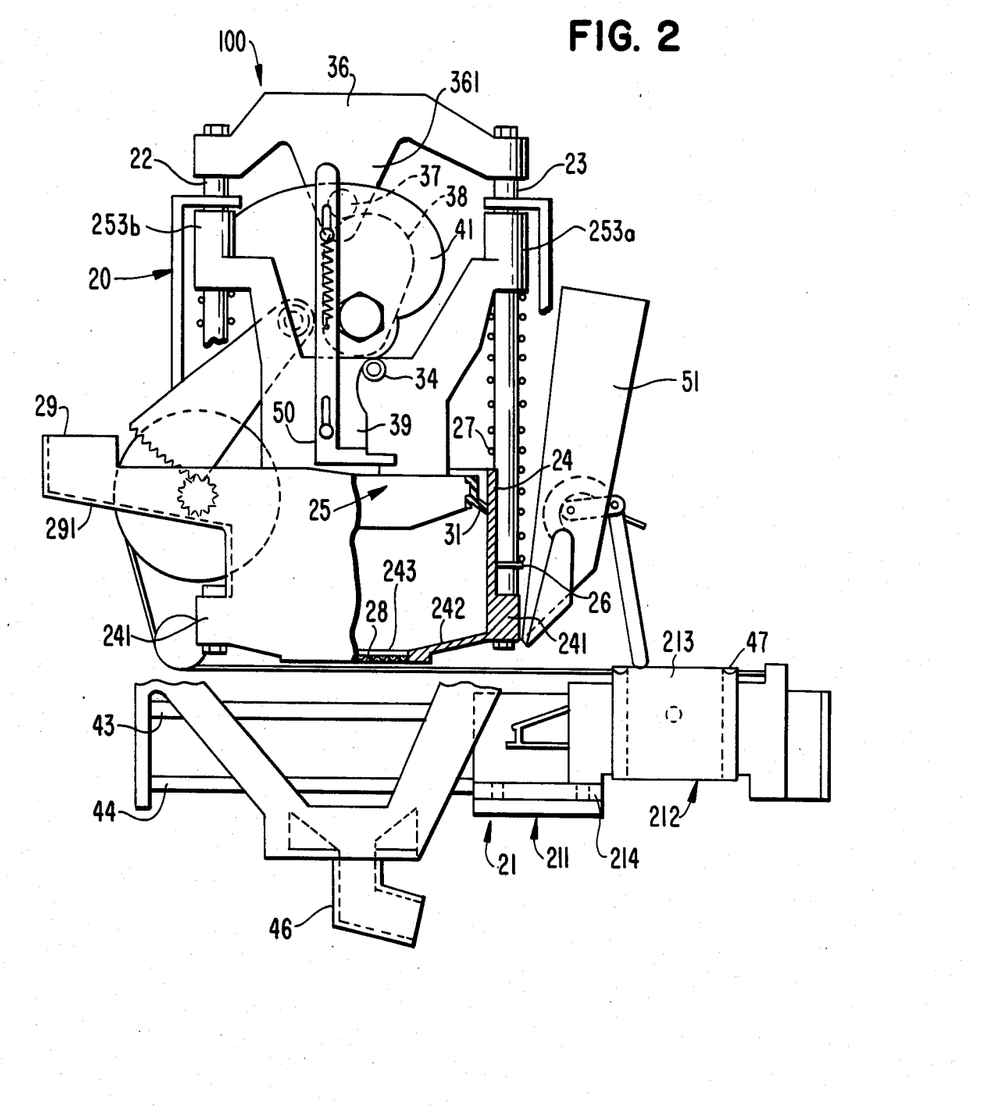
FIG. 2 is a partial sectional view of a beverage brewing apparatus according to one embodiment of this invention.
Figure 3:
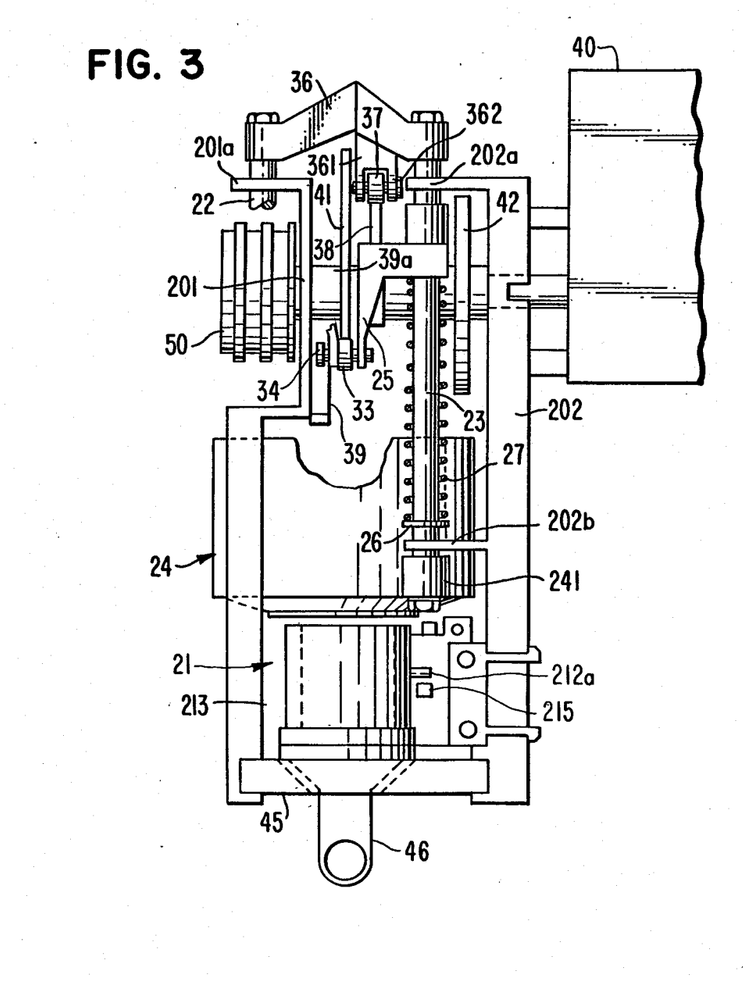
FIG. 3 is a partly cut away side view of the beverage brewing apparatus of FIG. 2.
Figure 4:
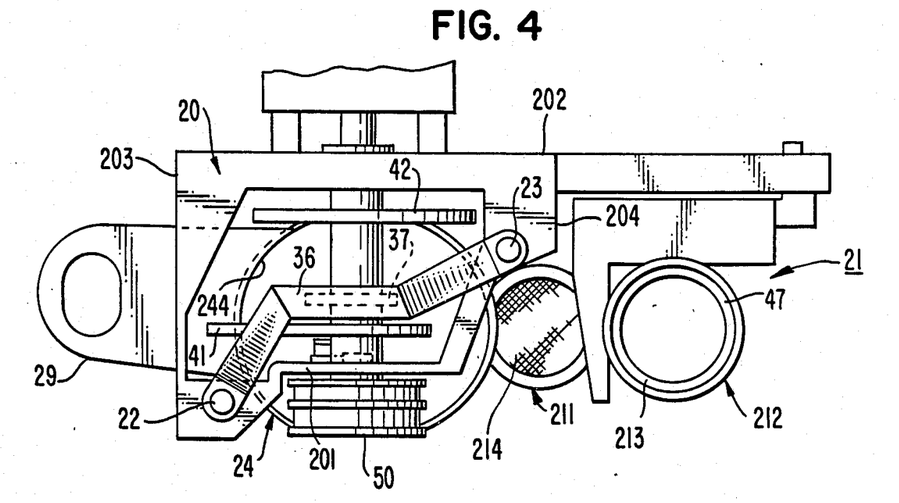
FIG. 4 is a plan view of the beverage brewing apparatus of FIG. 2.

Referring to FIGS. 2-4, a beverage brewing apparatus 100 in accordance with the present invention is shown. The brewing apparatus 100 includes a frame 20 defined by a front wall 201, rear wall 202 and side walls 203 and 204 (FIG. 4). Rear wall 202 provides a base portion 21 including a filter supporting carriage 211 and brewing cavity carriage 212 to be described hereinafter. The side walls 203 and 204 serve to maintain the proper spaced relation between front and back walls 201 and 202.

A front guide rod 22 is mounted on front wall 201 and a rear guide rod 23 is supported on rear wall 202. Guide rods 22 and 23 are generally diagonally opposite to one another within the frame 20 and support a brewing cylinder 24 and piston 25 to be described hereinafter.

Brewing cylinder 24 has a pair of supporting portions 241 projecting from an outer peripheral surface thereof. Each of the rods 22 and 23 extends vertically and is fixed to one of the supporting portions 241. Rod 23 is supported by bearing support 202a on rear wall 202 while rod 22 is supported by a corresponding bearing support 201a on front wall 201. A snap ring 26 is fitted on each of the guide rods 22 and 23, located above supporting portions 241 and a spring 27 surrounds each of rods 22 and 23 at a location above snap ring 26. Thus, cylinder 24 is fixed to and movable with rods 22 and 23.

As clearly shown in FIG. 2, cylinder 24 has a top opening and lower opening 243 with brewing cylinder 24 also having a sloped bottom 242 which extends to the reduced diameter lower opening 243 and is coaxial therewith. The lower opening 243 is covered by a fine mesh screen 28 which is removably disposed within opening 243. This screen 28 prevents coffee grounds or other extract material from entering into cylinder 24 together with the hot water while the brewing operation is in progress.

Figure 5:
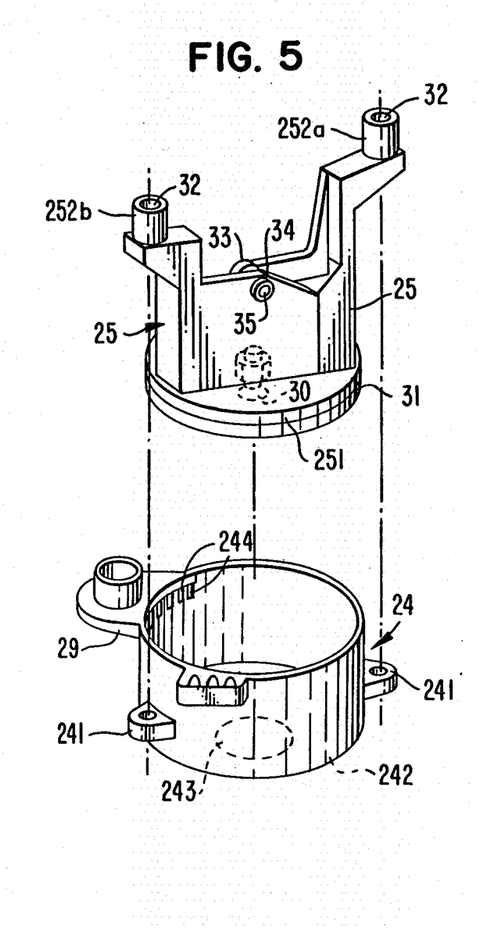
FIG. 5 is a diagrammatic exploded perspective view of the cylinder and piston used in the apparatus of FIG. 2.

Cylinder 24 is provided with a series of inlet ports 244 at its upper inner periphery (FIG. 5) and a chute 29 extends from the outer peripheral surface of cylinder 24 communicating with the interior inlet ports 244. Chute 29 has a sloping bottom wall 291 which communicates with inlet ports 244 so that hot water may be introduced through chute 29 at a location below piston 25 when piston 25 is in its uppermost position.

Piston 25 remains at all times within cylinder 24 and comprises a lower circular plate portion 251 and upper U-shaped bridge portion 252. Both portions 251 and 252 are connected with one another by a bolt-nut arrangement 30 as shown on FIG. 5. A seal element 31 is placed on the outer peripheral surface of lower portion 251 to effect sealing between cylinder 24 and piston 25. Upper U-shaped bridge portion 252 of piston 25 has a pair of ends 252a and 252b, and each of the ends 252a and 252b of bridge 252 is formed with a bore hole 32 through which one of the rods 22 and 23 extends. The upper ends of the springs 27 which are disposed to surrounds rods 22 and 23, respectively, are contacted with the under sides of the ends 252a and 252b of bridge 252. Springs 27 apply a force between snap rings 26 and ends 252a and 252b of bridge 252, thereby biasing piston 25 upwardly.

A cam follower 33 and a centering roller 34 are rotatably supported on bridge 252 through a shaft 35 disposed to extend through the center portion of bridge 252. The ends 252a and 252b of bridge 252 constitute a pair of bearing guides working as a three point suspension in conjunction with seal element 31 on piston 25. A guide element 39 is mounted on an inner surface of front wall 201 facing centering roller 34 to accommodate rolling motion of roller 34 along guide element 39.

Figure 7:
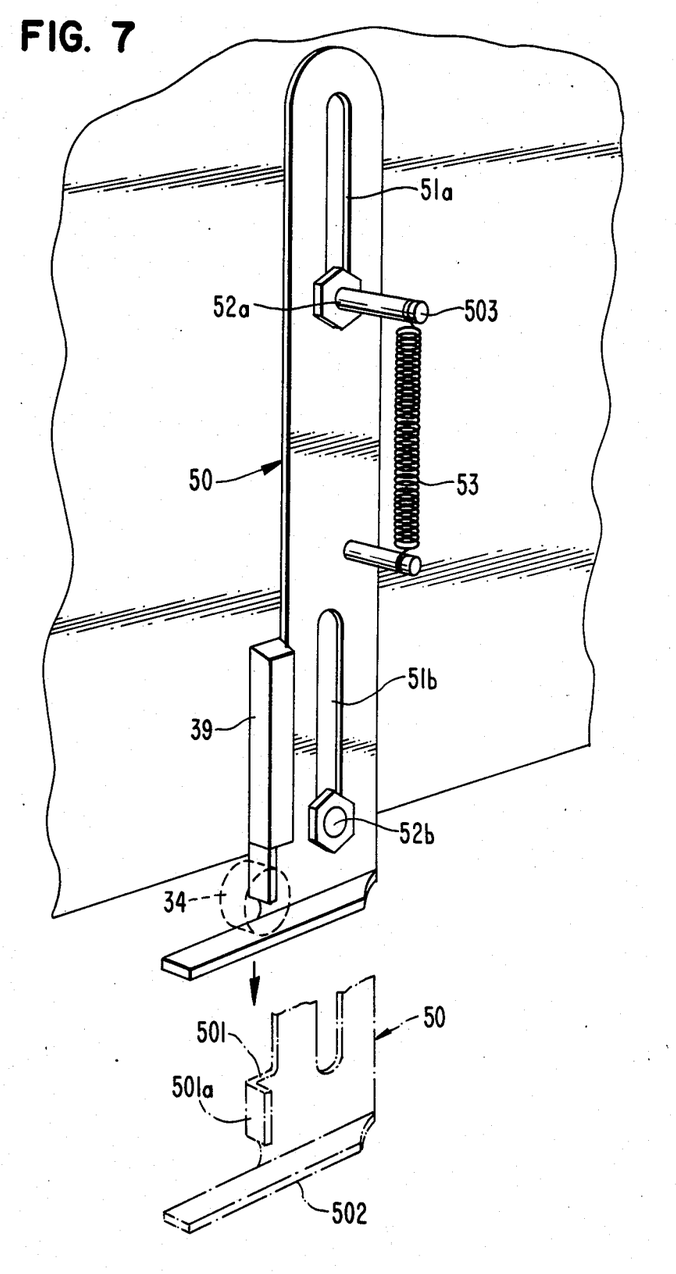
FIG. 7 is a diagrammatic exploded perspective view of an off-set preventing device used in the apparatus of FIG. 2.

As clearly shown in FIGS. 2 and 7, link member 50 is disposed on the side surface of guide member 39 opposite the surface rolled on by the center roller 34. Member 50 is provided with generally rectangular holes 51a and 51b at its upper and lower portions. Bolts 52a and 52b which are fixed on the inner surface of front wall 201 extend through the holes 51a and 51b, respectively. Therefore, the upward and downward movement of link member 50 is guided by holes 51a and 51b and bolts 52a and 52b.

Link member 50 also has a flange portion 501 on its lower end portion which includes a vertical flat surface 501a which lies in the same plane as the surface of guide element 39 to form a continuous rolling surface for roller 34. A horizontal flange portion 502 is also formed on the lower end of link member 50 with the plane surface of horizontal flange portion 502 crossing beneath the vertical flat surface 501a of flange portion 501. A support post 503 is provided on the center portion of link member 50 and one terminal end of a coil spring 53 is hooked onto the support post 503. The other terminal end of coil spring 53 is hooked onto the outer terminal end of bolt 52a extending from the upper positioned hole 51a of link member 50. Thus, link member 50 is normally biased upwardly due to the recoil strength of coil spring 53.

When link member 50 is disposed in its uppermost position, the vertical flat surface 501a of flange portion 501 is in contact with the lower end of guide element 39 to form a continuous rolling surface along guide member 39 and surface 501a for roller 34. The downwardly rolling motion of roller 34 is limited by the horizontal the flange portion 502.

A cylinder operating bridge 36 has its ends secured to the upper ends of rods 22 and 23, respectively. The arrangement is such that with cylinder 24 being fixed on the lower ends of rods 22 and 23, and cylinder operating bridge 36 being fixed on the upper ends of rods 22 and 23 there is provided a fixed position mounting system for insuring parallelism of rods 22 and 23. This also insures smooth upward and downward movements of vertical arm 361 extending downwardly from bridge 36.

Arm 361 of bridge 36 is provided with a slot in its lower end which rotatably supports a cam follower 37 on a support shaft 362 on arm 361, cam follower 37 being positioned to cooperate with cam 38.

A cam shaft 39a extends between front and rear walls 201 and 202. Rear wall 202 has a hole (not shown) through which one end of cam shaft 39a extends. This end of cam shaft 39a is connected with a motor device 40. Three cams including a first cam 41 acting as the piston cam cooperating with the piston cam follower 33, a second cam 38 cooperating with the bridge cam follower 37 and a third cam 42 are secured to cam shaft 39a spaced there along as shown in FIG. 3.

Base portion 21 includes upper and lower rods 43 and 44 as shown in FIG. 2. Brewing cavity carriage 212 which supports brewing cavity 213 is slidably supported on rods 43 and 44. Filter support carriage 211 in which filter 214 is removably disposed is also slidably supported on rods 43 and 44. Brewing cavity 213 has a groove formed in its upper surface to retain a seal element 47 that assures sealing between the lowermost surface of cylinder 24 and brewing cavity 213.

A funnel support 45 is supported between the front and rear walls 201 and 202. A funnel 46 extends through and is supported by the funnel support 45. The top of funnel 46 has an outwardly extending rectangular flange. The bottom of funnel 46 merges into a tubular section formed with an elbow to change direction whereby liquid flowing therethrough may be finally directed to a cup for receiving the beverage.

In the above described beverage brewing apparatus, upon initiation of an electrical input which may in response to introducing a coin into a dispensing mechanism, motor 40 turns cam shaft 39a clockwise as seen on FIG. 2.

As a result of the rotation of cam shaft 39a, brewing cavity carriage 212 moves horizontally toward the left side in FIG. 2 through the operation of third cam 42. When brewing cavity 213 is disposed above filter support carriage 211, a predetermined amount of ground coffee is supplied into brewing cavity 213 through coffee hopper 51. After brewing cavity 213 receives the ground coffee, brewing cavity 213 continues to move toward the left side together with filter support carriage 211. When brewing cavity 213 is properly aligned beneath cylinder 24, movement of cavity 213 and support carriage 211 is stopped and cylinder 24 moves downwardly into tight engagement with cavity 213. The tight sealing between cylinder 24 and brewing cavity 213 is secured by seal element 47 disposed on the upper surface of brewing cavity 213. As cam shaft 39a continues to rotate, a predetermined amount of hot water is supplied into cylinder 24 through chute 29. The timing for supply of the ground coffee into brewing cavity 213 and hot water into cylinder 24 is controlled by the rotation of pully 150 fixed on the front end of cam shaft 39a extending from front wall 201. Cam shaft 39a continues rotating clockwise with piston follower 33 riding in a dwell section of piston cam 41, as shown in FIG. 6.

As piston cam 41 rotates, piston 25 moves downwardly and during this downward movement of piston 25 the ends 252a and 252b of U-shaped bridge 252 compress springs 27 surrounding guide rods 22 and 23 to ensure sealing of seal element 47 disposed on brewing cavity 213 with a seal element (not shown) placed between the lowermost opening of brewing cavity 213 and filter 214. During the brewing operation, springs 27 are continuously compressed by the downward movement of U-shaped bridge 252 to insure sealing between cylinder 24 and brewing cavity 213, and between cavity 213 and filter 214. After piston 25 has passed water inlet ports 244 on the upper inner wall surface of cylinder 24, a layer of sealed air is trapped between the top of the hot water surface and bottom face of piston 25.

During the downward movement of piston 25, piston follower 33 as pushed by piston cam 41 is subjected to both downward and horizontal or lateral force components. The horizontal force component tends to cause offset of the center line of piston 25 from the center line of cylinder 24. However, centering roller 34 which is rotatably supported on the U-shaped bridge 252 rolls firstly along one side surface of guide element 39 and subsequently along the vertical flat surface 501a of flange portion 501 of link member 50. Therefore, lateral horizontal movements of piston 24 which might be caused by the movements of piston cam 41 are prevented by contact between centering roller 34 and guide element 39 or flange portion 501 of link member 50.

Figures 6, 8C:
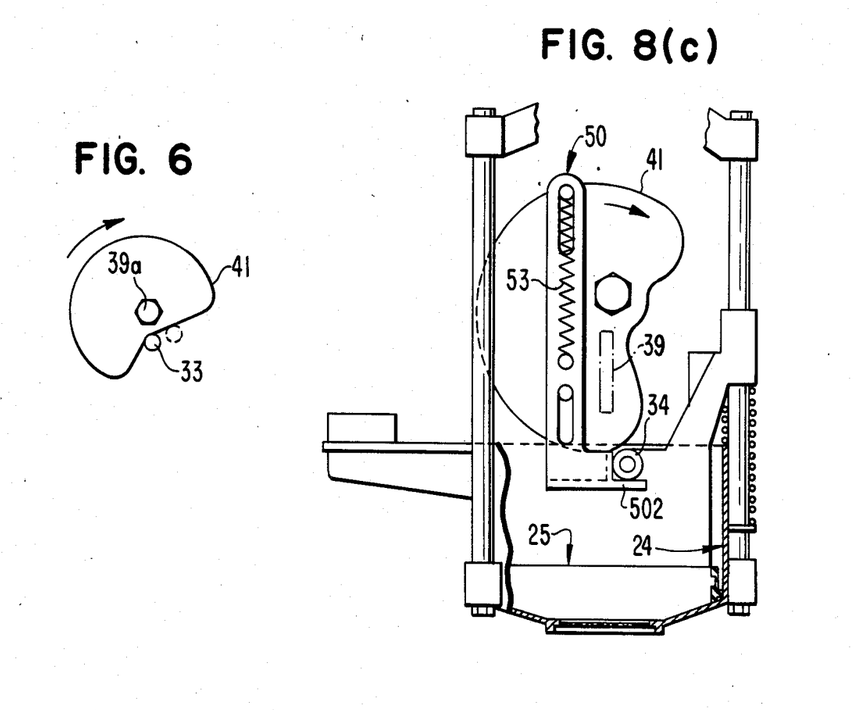
FIG. 6 is a diagrammatic view illustrating the operation of one cam element.
FIGS. 8(a)-8(c) are diagrammatic views illustrating the operation of the cam element and offset preventing device.
Figure 8A:
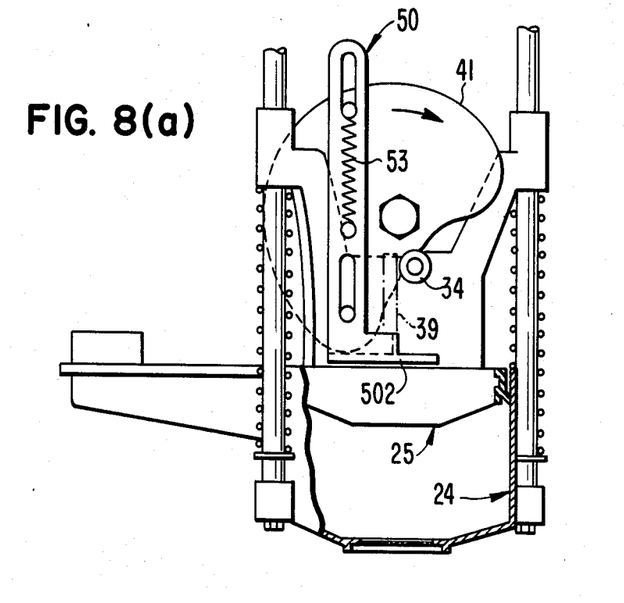
Figure 8B:
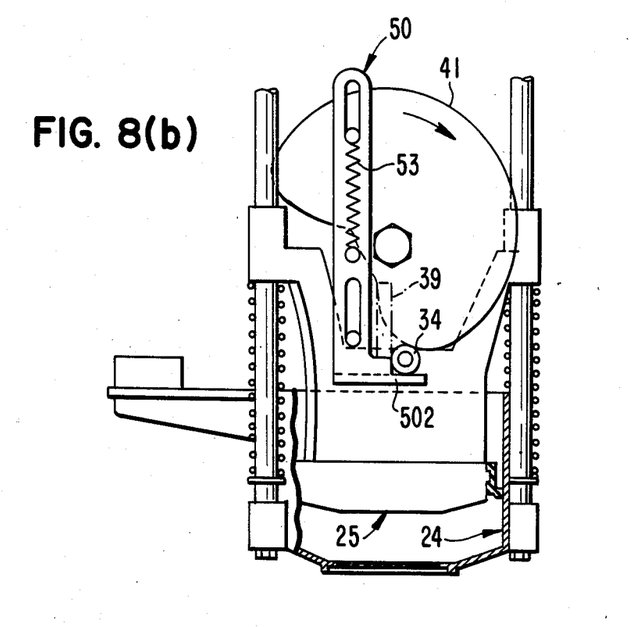

Referring to FIGS. 8a–8c, the movement of roller 34 and link member 50 will be more fully described. When the piston 24 is disposed in the upper portion of cylinder 25 at the start of the operation of a brewing process (this position being shown by FIG. 8a), centering roller 34 is in contact with the upper portion of guide element 39. At that time, link member 50 is disposed in its uppermost position due to the recoil strength of coil spring 53 and the upper surface of cylinder 25 is closely spaced below the horizontal flange portion 502 of link member 50.

During the rotation of piston cam 41 (the rotating direction of cam 41 being indicated by arrows in FIGS. 8a–8c), roller 34 rolls along the side surface of guide element 39 until it reaches the lower position of guide element 39. This rolling motion of roller 34 continues onto the vertical flat surface 501a of flange portion 501 and finally is stopped at the lower portion of link member 50, i.e., the roller 34 rolls along the vertical flat surface 501a of flange portion 501 and engages with the horizontal flange portion 502 (this position being shown by FIG. 8b).

As further rotation of piston cam 41 occurs, centering roller 34 is pushed downwardly together with downward movement of link member 50 until the piston is located in its lowermost position (this portion being shown by FIG. 8c). Because link member 50 is vertically movably supported on the front wall 201, the roller 34 which is disposed in the spaced defined between flange portion 501 and horizontal flange portion 502 is forced down without rotating movement of roller 34. Therefore, the lateral offset movement of piston 25 from the center line of cylinder 24 is effectively prevented.

When piston 25 reaches the lowered position whereat all of the hot water has been forced through the ground coffee in brewing cavity 213, piston 25 continues downwardly at a slightly increased speed to force hot air through the spent ground coffee tending to dry out the grounds, thereby rendering them in a dry enough state so that they may be easily discharged. The extracted beverage is supplied to a cup (not shown) through funnel 46.

When the filter support carriage 211 reaches a predetermined position, movement of filter support carriage 211 is stopped, but brewing cavity carriage 212 continues its rightward movement.

Figure 9:
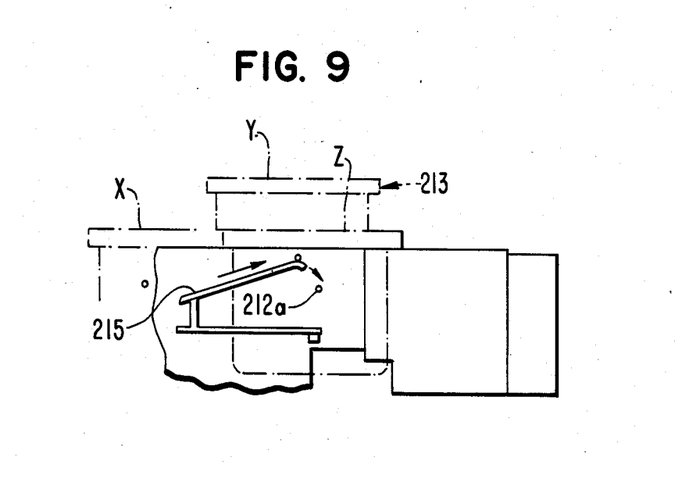
FIG. 9 is a partially enlarged view of the beverage brewing apparatus illustrating the operation of dumping the spent coffee grounds.

As shown in FIG. 9, after brewing cavity carriage 212 is separated from filter support carriage 211, pin 212a projecting from brewing cavity 213 makes contact with a spring like pawl 215 mounted on base portion 21. This contact between pin 212a and pawl 215 causes cavity 213 to be elevated due to the continued horizontal movement of brewing cavity 213. Thus, brewing cavity 213 moves upwardly from position X to position Y due to the continuing horizontal movement of brewing cavity 213. When brewing cavity 213 reaches its extreme top position Y, pin 212a rides off the end of pawl 215 dropping the cavity 213 into position Z. This downward motion and abrupt stop of brewing cavity 213 at position Z causes the dried out spent ground coffee to break completely and freely from cavity 213. After the spent ground coffee is discarded from brewing cavity 213, one brewing cycle has been completed.

As mentioned above, the piston member and/or piston moving device is provided with a mechanism to prevent lateral horizontal movement to thereby insure alignment of the axial center lines of the piston and the cylinder being maintained. Therefore, the quality of the extracting operation is easily assured. Also, the guide surface of the mechanism to prevent lateral horizontal movement consists of a plurality of elements. The lowermost postioned element is vertically movably supported on the frame of the apparatus to follow the movement of the piston and thereby insure that vertical movement of the piston is maintained until the lowermost position is reached without lateral horizontal movement occurring.

Furthermore, the straight downward movement of the piston is secured by a short length of the fixed guide surface and then by the movable guide surface. Therefore, the reciprocating movement of the piston is not obstructed by the offset preventing mechanism, and finally, the height of apparatus can be minimized.

This invention has been described in detail in connection with a preferred embodiment, but this is an example only and this invention is not to be considered as restricted thereto. It will be easily understood by those skilled in the art that other variations and modifications can be easily made within the scope of this invention as claimed.

I claim:

1. In a beverage apparatus comprising a frame, a vertically movable cylinder member supported on said frame, said cylinder member having an open top and an open bottom, a vertically movable piston member disposed in said cylinder and supported by said frame, means for supplying hot water into said cylinder below the elevation of said piston, a base assembly including a brewing cavity disposed beneath said cylinder member, said brewing cavity being mounted to be movable horizontally between a brewing position and a discharging position and be sealed with said cylinder member in said brewing position, a motor driven cam shaft, a plurality of cams on said cam shaft, a first cam follower on said piston member, a second cam follower on said cylinder member, each of said cam followers being in contact with one of said cams whereby movement of said piston member and said cylinder member is determined by operation of said cams through said cam followers, and mechanism for preventing said piston member from undergoing lateral horizontal movement while said piston member moves downwardly, the improvement comprising said mechanism for preventing horizontal movement including a plurality of guide elements to control the reciprocating motion of said piston, said guide elements being vertically disposed on said frame, and the lowermost positioned guide element being movably supported on said frame and normally biased upwardly.

2. The beverage brewing apparatus of claim 1 wherein said mechanism for preventing horizontal movement includes a guide roller element affixed to said piston member and said lowermost positioned guide element comprises a L-shaped link element having a vertical surface and a horizontal surface to engage said guide roller element of said piston member.

3. The beverage brewing apparatus of claim 2 wherein generally rectangular-shaped holes are formed through upper and lower portions of said L-shaped link element, and pins are extended from said frame through said holes, respectively, to vertically movably mount said link element.

4. The beverage brewing apparatus of claim 2 or claim 3 wherein said L-shaped link element is biased upwardly due to recoil strength of a coil spring.

* * * * *